United States Patent [19]
Kawamoto et al.

[11] Patent Number: 6,162,861
[45] Date of Patent: Dec. 19, 2000

[54] GRANULATED POWDERY PAINT AND PROCESS FOR PRODUCING THE SAME

[75] Inventors: Yugen Kawamoto, Hiratsuka; Yoshinori Kato, Yokohama; Shinichi Ueda, Hiratsuka; Mituo Wakimoto, Isehara; Toshio Ohkoshi, Atsugi, all of Japan

[73] Assignee: Kansai Paint Company, Limited, Amagasaki, Japan

[21] Appl. No.: 09/423,803

[22] PCT Filed: May 15, 1998

[86] PCT No.: PCT/JP98/02165

§ 371 Date: Nov. 12, 1999

§ 102(e) Date: Nov. 12, 1999

[87] PCT Pub. No.: WO98/51748

PCT Pub. Date: Nov. 19, 1998

[30] Foreign Application Priority Data

May 15, 1997 [JP] Japan .................................... 9-125443

[51] Int. Cl.$^7$ ...................................................... C08L 37/00
[52] U.S. Cl. .......................... 524/517; 524/523; 524/524; 523/309
[58] Field of Search ..................................... 524/517, 523, 524/524; 523/309

[56] References Cited

FOREIGN PATENT DOCUMENTS 7-188586  7/1995  Japan .
95/25145  9/1995  WIPO .

*Primary Examiner*—Edward J. Cain
*Attorney, Agent, or Firm*—Armstrong, Westerman, Hattori, McLeland & Naughton

[57] ABSTRACT

The present invention provides a granulated powder coating composition prepared by granulating a starting powder coating composition having an average particle size of 10 $\mu$m or less to an average particle size suitable for powder coating; and a process for preparing a granulated powder coating composition, comprising granulating a starting powder coating composition having an average particle size of 10 $\mu$m or less to an average particle size suitable for powder coating.

5 Claims, 2 Drawing Sheets

GRANULATED POWDERY PAINT AND PROCESS FOR PRODUCING THE SAME

TECHNICAL FIELD

The present invention relates to novel granulated powder coating compositions and processes for their preparation.

BACKGROUND ART

Powder coating compositions have many advantages over conventional solvent-based coating compositions. For example, they are non-polluting and easy to recover, and their production lines are easy to control. Because of these advantages, powder coating compositions have been drawing attention particularly in the field of automotive coating. However, when a conventional powder coating composition is applied to automotive exterior panels or like parts that are required to be coated with a coating film with good finishing appearance, the composition needs to be applied to an increased thickness to achieve a sufficient smoothness. For example, in order to attain a film smoothness equivalent to that of an about 40 $\mu$m-thick coating film formed from a solvent-based coating composition, the conventional powder coating composition needs to be applied to a thickness of about 60 $\mu$m or more. Therefore, powder coating compositions are demanded which are capable of forming a thin coating film having an improved smoothness.

Attempts have been made to improve the film smoothness of powder coating compositions by reducing the particle size of the compositions as much as possible. However, powder coating compositions having a reduced particle size are disadvantageous in that they are low in coating efficiency in electrostatic powder coating, necessitate a troublesome procedure for recovery owing to the lowered coating efficiency, and give coating films with poor finishing appearance because of the increased number of recovery steps which cause variation in the particle size of the powder coating compositions or contamination with foreign matter such as dust. On the other hand, powder coating compositions having an increased particle size result in coating films with poor smoothness, although being improved in coating efficiency.

No powder compositions have been so far proposed which realize both a high coating efficiency and good film smoothness.

DISCLOSURE OF THE INVENTION

An object of the present invention is to provide a novel granulated powder coating composition free from the above disadvantages of the prior art, and a process for its preparation.

Another object of the present invention is to provide a novel granulated powder coating composition that realizes both a high coating efficiency and good film smoothness, and a process for its preparation.

Other objects and features of the present invention will become apparent in the following descriptions.

The present invention provides a granulated powder coating composition prepared by granulating a starting powder coating composition having an average particle size of 10 $\mu$m or less to an average particle size suitable for powder coating.

The present invention also provide a process for preparing a granulated powder coating composition, the process comprising granulating a starting powder coating composition having an average particle size of 10 $\mu$m or less to an average particle size suitable for powder coating.

The present inventors conducted extensive research to overcome the above disadvantages of the prior art, and surprisingly found that when a conventional powder coating composition is granulated to a specific average particle size, the resulting granulated powder coating composition is capable of achieving both a high coating efficiency and film smoothness, and good in application workability.

The present invention has been accomplished based on this novel finding.

As used herein, the term "granulate" is intended to mean "to agglomerate powder particles into granules or agglomerates having a greater diameters".

The granulated powder coating composition of the invention is prepared by agglomerating particles of a starting powder coating composition into granules having an average diameter suitable for powder coating.

The starting powder coating composition for use in the granulated powder coating composition of the invention is usually required to have an average particle size of 10 $\mu$m or less, from the viewpoint of film smoothness of the granulated powder coating composition. It is preferable the starting powder coating composition has an average particle size of 1 to 8 $\mu$m.

The average particle size of the granulated powder coating composition is not limited as long as it is suitable for powder coating, but is preferably 10 to 50 $\mu$m from the viewpoint of coating efficiency.

The granulated powder coating composition of the invention can be prepared by granulating a starting powder coating composition having an average particle size of 10 $\mu$m or less to an average particle size suitable for powder coating.

The starting powder coating composition for use in the process of the invention may be a known powder coating composition.

Examples of preferred starting powder coating compositions include a thermosetting powder coating composition comprising a powder base resin which is melted and fluidized when heated, and a curing agent. The softening temperature of the powder base resin is usually about 40 to 100° C.

Usable powder base resins include resins having a functional group which reacts with the curing agent when heated. Specific examples of such resins include acrylic resins, polyester resins, epoxy resins and hybrids of these resins. Preferred functional groups include hydroxyl, carboxyl, epoxy, blocked isocyanate, etc.

The curing agent may be one having a functional group which reacts with the functional group in the base resin to form a cured coating film, or one capable of initiating polymerization of the functional group in the base resin. Examples of curing agents for hydroxyl-containing base resins include amino resins and blocked isocyanate compounds. Examples of curing agents for carboxyl-containing base resins include polyepoxides and β-hydroxyethyl alkylamides. Examples of curing agents for epoxy-containing base resins include polycarboxylic acids, initiators for cationic polymerization of epoxy groups. Examples of curing agents for blocked isocyanate-containing base resins include polyols.

Examples of amino resins include hexamethoxymelamine resins, hexaethoxymelamine resins, "Cymel 303" (tradename, a product of Mitsui Cytec, Ltd.) and "Sumimal M-55" (tradename, a product of Sumitomo Chemical Co., Ltd.). Examples of blocked isocyanate compounds include those obtained by blocking an aliphatic, alicyclic or aromatic polyisocyanate with a blocking agent such as a phenol, ε-caprolactam or alcohol. The aliphatic, alicyclic or aromatic polyisocyanate may be isophorone diisocyanate, hexamethylene diisocyanate, xylylene diisocyanate, tolylene diisocyanate, hydrogenated xylylene diisocyanate, hydrogenated tolylene diisocyanate or the like. Examples of polyepoxides include homopolymers and copolymers of triglycidyl isocyanurate or glycidyl (meth)acrylate; and "Celoxide 2021" (tradename) and "EHPE-3150" (tradename) both manufactured by Daicel Chemical Industries, Co., Ltd. Examples of β-hydroxyethyl alkylamides include β-hydroxyethyl propylamide. Examples of polycarboxylic acids include adipic acid, sebacic acid, suberic acid, succinic acid, glutaric acid, maleic acid, fumaric acid, dodecanedioic acid, pimelic acid, azelaic acid, itaconic acid, citraconic acid and like aliphatic polycarboxylic acids and their anhydrides; terephthalic acid, isophthalic acid, phthalic acid, trimellitic acid, pyromellitic acid and like aromatic polycarboxylic acids and their anhydrides; and hexahydrophthalic acid, hexahydroisophthalic acid, methylhexahydrophthalic acid and like alicyclic polycarboxylic acids and their anhydrides. Examples of polyols include trimethylolpropane, sorbitol and tris(2-hydroxyethyl)isocyanurate. Examples of initiators for cationic polymerization of epoxy groups include benzyl-4-hydroxyphenylmethyl methylsulfonium hexafluoroantimonate and benzyl-4-hydroxyphenyl methylsulfonium hexafluorophosphate.

The starting powder coating composition may contain, in addition to the base resin and curing agent, curing catalysts, organic coloring pigments, inorganic coloring pigments, fillers, UV stabilizers, UV absorbers, fluidity modifiers, anti-cissing agents, etc., where necessary.

The starting powder coating composition can be prepared by conventional methods such as the melting and kneading method and lyophilizating method. The melting and kneading method comprises blending the base resin, curing agent and optionally other components in a mixer or the like, and melting and kneading the dry blend with heating, followed by cooling, coarse grinding, fine grinding, and sieving. The lyophilizating method comprises dissolving or dispersing the base resin, curing agent and optionally other components, in an organic solvent having a melting point of −40° C. or above, freezing the solution or dispersion usually at 10 to −40°0C., and removing the solvent under reduced pressure for drying. Usable solvents include tert-butanol and dioxane.

According to the invention, the starting powder coating composition has an average particle size of 10 μm or less, preferably 1 to 10 μm, more preferably 1 to 8 μm. If the average particle size exceeds 10 μm, the resulting granulated powder coating composition has too large an average particle size to attain a sufficient film smoothness.

In the present invention, the average particle size of the starting powder coating composition and granulated powder coating composition is defined as the particle size with a cumulative frequency of 50%, as calculated from the results of particle size distribution analysis. The particle size distribution is analyzed using, for example, "Microtrac" (tradename of a FRA particle size analyzer manufactured by Nikkiso K.K.).

The process for preparing the granulated powder coating composition of the invention comprises granulating the above starting powder coating composition to an average particle size suitable for powder coating. More specifically, the granulated powder coating composition can be preferably prepared by the following processes (1) to (8).

(1) A process for preparing a granulated powder coating composition, the process comprising heating the starting powder coating composition with agitation, at a temperature at which the starting composition melts at the particle surfaces but does not melt in the particle interiors.

According to the process (1), the starting powder coating composition is agitated and dispersed with heating at a temperature at which particles of the starting composition melt and adhere to each other but are not fused together or markedly deformed, to thereby obtain a granulated powder coating composition. The conditions for granulation by heating vary depending on the softening temperature and melting viscosity of the starting composition used, the production amount, and other factors. Thus, suitable conditions can be selected according to the starting composition used, and other factors. It is usually suitable to perform the heating at about 40 to 80° C., preferably 40 to 60° C., for about 1 minute to 20 hours, preferably about 5 minutes to 10 hours.

(2) A process for preparing a granulated powder coating composition, the process comprising adding an aqueous binder (a) dropwise to the starting powder coating composition with agitation and drying the resulting granules under reduced pressure.

According to the process (2), an aqueous binder (a) is added dropwise to the starting composition with agitation to form granules, and the granules are dried under reduced pressure at a temperature at which the particles of the starting composition do not melt, to thereby obtain a granulated powder coating composition. The conditions for granulation by addition of the aqueous binder (a) and drying under reduced pressure vary depending on the melting point, softening temperature, melting viscosity of the binder and starting composition used, the production amount, and other factors. Thus, suitable conditions can be selected according to the starting composition used, and other factors. It is usually suitable to perform the addition and drying at about 10 to 80° C., preferably 30 to 50° C. for about 1 minute to 20 hours, preferably about 5 minutes to 10 hours.

The aqueous binder (a) may be at least one member selected from polyethylene glycols, celluloses, polyvinyl alcohols, polyethylene oxide waxes, paraffin waxes, colloidal silicas, acrylic resin emulsions, acrylic resin-silicone resin emulsions, polyester resin emulsions, urethane resin emulsions and the like. The concentration and amount of the aqueous binder (a) vary depending on the solubility, binding capacity, viscosity and dispersion stability of the binder, and other factors. Thus, a suitable concentration and amount can be selected according to the binder and starting composition used. It is usually suitable to dilute the binder with water to a concentration of about 0.1 to 100 wt. %, preferably 0.5 to 20 wt. %, and use the obtained binder solution in an amount of about 0.01 to 100 wt. %, preferably 10 to 50 wt. %, relative to the starting composition.

(3) A process for preparing a granulated powder coating composition, the process comprising dry blending the starting powder coating composition with a solid binder (b) having an average particle size of 10 μm or less and heating the dry blend at a temperature at which the binder (b) melts but the starting composition does not melt.

According to the process (3), a solid binder (b) having an average particle size of 10 μm or less is dry blended with the starting composition, and the dry blend is agitated and dispersed with heating at a temperature at which the binder melts and binds the particles of the starting composition but the starting composition does not melt, to thereby obtain a granulated powder coating composition. The conditions for granulation by dry blending and heating vary depending on the softening temperature, melting point and melting viscosity of the starting composition and binder, and other factors. Thus, suitable conditions can be selected according to the starting composition used, and other factors. It is usually suitable to perform the dry blending and heating at about 20 to 80° 4C., preferably 30 to 60° C., for about 1 minute to 20 hours, preferably about 5 minutes to 10 hours.

The solid binder (b) has a melting point lower than that of the starting composition. Preferred examples of such binders include resins, curing agents for the starting composition, higher alcohols, monobasic acids, waxes and the like. These binders may be used singly or in combination. Examples of resins include acrylic resins, polyester resins, epoxy resins and fluorocarbon resins. Examples of curing agents include polycarboxylic acids, carboxylic anhydrides, blocked isocyanate compounds, polyol compounds and amino resins. Examples of higher alcohols include cetyl alcohol and stearyl alcohol. Examples of monobasic acids include lauric acid, myristic acid, palmitic acid, stearic acid and behenic acid. Examples of waxes include polyethylene wax, paraffin wax, carnauba wax, microcrystalline wax and montan wax. It is usually preferable that the binder has a melting point of about 10 to 70° C., particularly about 20 to 60° C.

The amount of the solid binder (b) to be added varies depending on the melting temperature, binding capacity and viscosity of the binder, and other factors. Thus, a suitable amount can be selected according to the binder and starting composition used. It is usually suitable to add the binder (b) in an amount of about 0.1 to 50 wt. %, preferably about 3 to 30 wt. %, relative to the starting composition.

The solid binder (b) may be ground to an average particle size of 10 μm or less in a jet mill or like apparatus, before being dry blended with the starting composition. Alternatively, the binder (b) may be blended with the components of the starting composition when preparing the starting composition, and melted, kneaded and ground together with these components.

(4) A process for preparing a granulated powder coating composition, the process comprising adding an aqueous organic solvent (c) dropwise to the starting powder coating composition with agitation so that the starting composition dissolves at the particle surfaces but does not dissolve in the particle interiors, and drying the resulting granules under reduced pressure.

According to the process (4), an aqueous organic solvent (c) is added dropwise to the starting composition with agitation so that the starting composition dissolves at the particle surfaces but does not dissolve in the particle interiors, to form granules. Then, the granules are dried under reduced pressure to thereby obtain a granulated powder coating composition. The conditions for granulation by addition of the organic solvent and drying under reduced pressure vary depending on the melting point and softening temperature of the starting composition, and the dissolving power, viscosity and boiling point of the organic solvent, the production amount, and other factors. Thus, suitable conditions can be selected according to the starting composition used, and other factors. Usually, it is suitable to perform the addition and drying at about 20 to 60° C., preferably 30 to 50° C., for about 1 minute to 20 hours, preferably about 5 minutes to 10 hours.

The aqueous organic solvent (c) may be, for example, a ketone solvent such as acetone or methyl ethyl ketone; an alcohol solvent such as methanol, ethanol, isopropyl alcohol or sec-butanol; an ether solvent such as diethyl ether, methyl cellosolve, ethyl cellosolve or butyl cellosolve; or a water-soluble organic solvent such as trifluoroolefin.

The concentration and amount of the aqueous organic solvent (c) vary depending on the solubility, softening temperature and viscosity of the starting composition, the production amount, and other factors. Thus, a suitable concentration and amount can be selected according to the starting composition used and other factors. It is usually suitable to dilute the solvent with water to a concentration of about 1 to 80 wt. %, preferably about 5 to 10 wt. %, and use the obtained solution in an amount of about 5 to 50 wt. %, preferably about 5 to 20 wt. %, relative to the starting composition.

(5) A process for preparing a granulated powder coating composition, the process comprising mixing the starting powder coating composition in an aqueous surfactant solution (d) with stirring to form a slurry, heating the slurry at a temperature at which the starting composition melts at the particle surfaces but does not melt in the particle interiors, and drying the resulting granules under reduced pressure.

According to the process (5), the starting composition is mixed in an aqueous surfactant solution (d) with stirring to give a slurry, and the slurry is stirred and dispersed with heating at a temperature at which the particles of the starting composition melt and adhere to each other but are not fused together or markedly deformed, giving granules. The granules are dried under reduced pressure to thereby obtain a granulated powder coating composition. This process is advantageous in that, because the starting composition is granulated as dispersed in the aqueous solution (d), the composition is heated uniformly and formed into spherical granules which realize good application workability and closest packing of the coating film. The aqueous binder (a) or solid binder (b) may be added in order to promote granulation of the dispersed starting composition. The conditions for granulation by heating of the slurry and drying under reduced pressure vary depending on the surface tension, melting point, viscosity, softening temperature and melting viscosity of the starting composition and surfactant, the production amount, and other factors. Thus, suitable conditions can be selected according to the starting composition and surfactant used, and other factors. It is usually suitable to perform the heating and drying at about 20 to 80° C., preferably 30 to 60° C., for about 1 minute to 20 hours, preferably about 5 minutes to 10 hours. The drying is carried out at a temperature at which the particles of the starting composition do not melt, i.e., usually at about 10 to 40° C., preferably at 30 to 40° C.

The aqueous surfactant solution (d) is usually an aqueous solution of at least one surfactant selected from anionic surfactants, cationic surfactants, amphoteric surfactants and nonionic surfactants. The surfactant concentration is not limited but is preferably about 0.0001 to 5 wt. %. Further, it is preferable that the aqueous surfactant solution (d) contains the aqueous binder (a).

Usable anionic surfactants include, for example, higher alcohol ethoxy sulfate, sodium laurylate and sodium dioctyl sulfosuccinate. Usable cationic surfactants include, for example, polyamide, lauryl dimethylbenzyl ammonium chloride and dimethyl dodecyl phenylphosphonium chloride. Usable amphoteric surfactants include, for example, lauryl betaine and stearyl betaine. Usable nonionic surfactants include, for example, polyoxyethylene alkyl ether, polyoxyethylene alkyl phenol ether and sorbitan fatty acid ester.

(6) A process for preparing a granulated powder coating composition, the process comprising adding a liquid photocurable composition (e) dropwise to the starting powder coating composition with agitation, curing the photocurable composition by light irradiation, and drying the resulting granules under reduced pressure.

According to the process (6), a liquid photocurable composition is added dropwise to the starting composition with agitation, and the photocurable composition is cured by light irradiation to increase the viscosity, so that the starting composition is granulated by the binding action of the photocurable composition. The resulting granules are dried under reduced pressure to thereby obtain a granulated powder coating composition. The conditions for granulation by light irradiation are not limited, but it is preferable to perform the irradiation with light having a wavelength of 300 to 4500 Å using a light source such as sunlight, mercury lamp, xenon lamp or arc lamp. A preferable irradiation time is about 1 second to 20 minutes. The temperature and time period for granulation by light irradiation and drying under reduced pressure vary depending on the viscosity and softening temperature of the starting composition and photocurable composition, the production amount, and other factors. Thus, a suitable temperature and time period can be selected according to the starting composition used and other factors. It is usually suitable to perform the light irradiation and drying at about 20 to 80° C., preferably 20 to 40° C., for about 1 minute to 20 hours, preferably about 5 minutes to 10 hours.

The amount of the liquid photocurable composition to be used varies depending on the curability and viscosity after curing of the photocurable composition, the amount of irradiation, the solubility, softening temperature and viscosity of the starting composition, the production amount, and other factors. Thus, a suitable amount can be selected according to the starting composition used, and other factors. It is usually suitable to add the photocurable composition in an amount of, on a solids basis, about 1 to 30 wt. %, preferably about 5 to 20 wt. %, relative to the starting composition.

The liquid photocurable composition usually contains, as essential components, an epoxy-containing resin, a photo-induced cationic polymerization initiator and a medium. Usable media include conventional organic solvents for coating compositions.

The epoxy-containing resin is a resin containing at least one epoxy group on average per molecule. Examples of epoxy-containing resins include epoxy-containing acrylic resins and epoxy-containing polyester resins.

The photo-induced cationic polymerization initiator is a compound capable of producing a cation upon application of an active energy beam to thereby initiate cationic polymerization of an epoxy group. Onium salts can be preferably used. Specific examples of onium salts include p-methoxybenzenediazonium hexafluorophosphate, diphenyliodonium hexafluorophosphate and triphenylsulfonium hexafluorophosphate.

Commercial products of photo-induced cationic polymerization initiators include, for example, "Cyracure UVI-6970" (trade name of a sulfonium salt-based initiator) and "Cyracure UVI-6990" (trade name of a sulfonium salt-based initiator), both manufactured by Union Carbide Corp.

Usable organic solvents include those capable of dissolving or dispersing the epoxy-containing resin and substantially unreactive with an epoxy group. Specific examples include toluene, xylene and like aromatic solvents; ethanol, propanol, butanol and like alcohol solvents; ethyl cellosolve, butyl cellosolve and like ether solvents; and acetone, methyl ethyl ketone and like ketone solvents.

In the photocurable composition, the proportion of the photo-induced cationic polymerization initiator is about 0.01 to 20 parts by weight, preferably 0.1 to 10 parts by weight, per 100 parts by weight (on a solids basis) of the epoxy-containing resin. If the proportion of the photo-induced cationic polymerization initiator is less than 0.01 parts by weight, the amount of cations produced is so small that the curing by cationic polymerization does not sufficiently proceed. On the other hand, addition of more than 20 parts by weight of the initiator does not further improve the efficiency of the cationic polymerization, merely increasing the cost.

(7) A process for preparing a granulated powder coating composition, the process comprising applying to the starting powder coating composition a pressure sufficient to melt and bind the particle surfaces of the starting composition to thereby form a granular solid product in the form of a sheet or grains, and grinding and classifying the granular solid product to an average particle size suitable for powder coating.

According to the process (7), a pressure is applied to melt and bind the particle surfaces of the starting composition, to thereby form a granular solid product in the form of a sheet or grains. The solid product is then ground and classified to obtain a granulated powder coating composition. The pressure to be applied varies depending on the softening temperature and melting viscosity of the starting composition, the production amount, and other factors. Thus, a suitable pressure can be selected according to the starting composition used, and other factors. It is generally suitable to apply a pressure of about 100 to 10000 $Kg/cm^2$, preferably 500 to 4000 $Kg/cm^2$. If the pressure applied is less than 100 $Kg/cm^2$, the particles of the starting composition do not sufficiently adhere to each other, and thus the solid product, when ground, separates into the particle size of the starting composition. On the other hand, if a pressure over 10000 $Kg/cm^2$ is applied, the particles of the starting composition are fused together to form a solid product which does not consist of granules but has uniform structure. As the result, small particles that have not been granulated are present in the obtained powder coating composition, reducing the application workability.

In the process (7), a compression apparatus is used which comprises transfer unit for microfine powders and compression unit. Examples of such apparatus include "Roller Compactor RCP-200H" (tradename) and "Roller Compactor MRCP-200" (tradename), both manufactured by Kurimoto, Ltd.

The solid product obtained by compression in the compression apparatus is finely ground using a pin disc or like means, and sieved through a suitable sieve for classification, giving the desired granulated powder coating composition suitable for powder coating.

In the process (7), at least one of the aqueous binder (a), solid binder (b), aqueous organic solvent (c), aqueous surfactant solution (d) and liquid photocurable composition (e) can be used for promoting granulation.

(8) A process for preparing a granulated powder coating composition, the process comprising bringing the particles of the starting powder coating composition into striking contact with each other at a high speed to melt and bind the particle surfaces.

According to process (8), the particles of starting powder coating composition can be brought into striking contact using, for example, an impact means such as an impact apparatus for powders which comprises:

an impact chamber including a rotating disc having impact pins along the periphery thereof, and a impingement ring disposed along the outermost circumferential track of the impact pins with a given clearance; and a circulating passageway extending from an opening at a part of the impingement ring to a point close to the center of the rotating disc.

In the apparatus, the particles of the starting composition fed into the impact chamber are brought into an instantaneous striking contact with each other by the impact pins disposed on the rotating disc operating at a high speed, and further strike into the impingement ring surrounding the rotating disc, so that the particles are bound to each other by strong compression action. The bound particles are subjected to the impact action again by being returned to the impact chamber through the circulating passageway. By being subjected to the impact action many times in a short period, the particles of the starting composition are firmly bound to each other and formed into granules.

In the process (8), at least one of the aqueous binder (a), solid binder (b), aqueous organic solvent (c), aqueous surfactant solution (d) and liquid photocurable composition (e) can be used.

The granules of the thus obtained granulated powder coating composition of the invention are agglomerates each made of several particles of the starting composition. It is preferable that, in the agglomerates, the particles of the starting composition substantially retain their shape before granulation, and adhere to each other so as not to separate into particles during transfer from a coating composition tank to an electrostatic coating apparatus, or during electrostatic spray coating.

The granulated powder coating composition of the invention has an average particle size suitable for powder coating. It is usually preferable that the composition has an average particle size of 10 to 50 μm, particularly 12 to 25 μm. If the particle size is below the specified range, the coating composition shows poor coating efficiency in electrostatic coating, whereas an average particle size over the specified range results in a poor film smoothness.

The granulated powder coating composition of the invention can be applied to a substrate and baked to form a cured coating film.

The substrate is not limited and may be conventional one as long as it is amenable to powder coating. Examples of usable substrates include metals, surface-treated metals, plastics, and these substrates coated with coating films. Powder coating is carried out preferably by methods known per Se, such as electrostatic powder coating and frictional electrification coating. The film thickness is not limited, and is usually about 20 to 80 μm, preferably about 20 to 70 μm (when cured). The coating is baked usually at about 100 to 250° C. for about 3 to 120 minutes.

The granulated powder coating composition of the invention can be used, without limitation, in applications wherein conventional powder coating compositions are utilized, such as automobiles, electric appliances, steel furniture, office goods and construction materials. In particular, the composition of the invention is suitable as an automotive thermosetting powder coating composition to be applied to automotive exterior and interior panels that are required to be coated with a coating film with a good surface smoothness.

BEST MODE FOR CARRYING OUT THE INVENTION

The present invention will be described below in further detail with reference to Examples and Comparative Examples, wherein parts and percentages are all by weight.

EXAMPLE 1

Dry blended in a Henschel mixer were 1000 parts of an acrylic powder resin (tradename "FINEDIC A207S", an epoxy-containing acrylic resin manufactured by Dainippon Ink & Chemicals, Inc.) and 290 parts of dodecanedioic acid. The dry blend was melted and kneaded for dispersion in a twin-screw extruder. The kneaded melt was cooled and coarsely ground. The coarse grains were finely ground in a jet mill, and sieved to obtain a thermosetting acrylic resin powder coating composition having an average particle size of about 6 μm and a melting point of 52° C. (as determined by differential scanning calorimetry).

Figure 1:
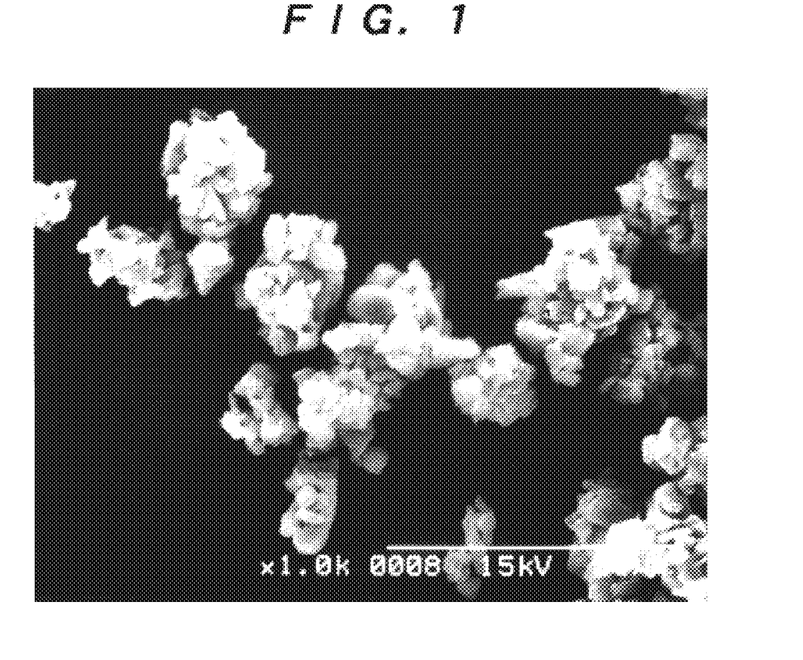
FIG. 1 is a photograph substituted for a drawing, showing the powder coating composition of the invention obtained in Example 1 as seen through a scanning electron microscope.

200 parts of the above-obtained powder coating composition was placed in a 2-liter, high-speed mixer (a product of Fukae Kogyo K.K.), and heated at 50° C. for 30 minutes with agitating at an agitator speed of 500 rpm and a chopper speed of 4000 rpm, for granulation. The resulting granules were cooled to 20° C. over 5 minutes to obtain a granulated powder coating composition. The obtained composition of the invention had an average particle size of about 14 μm and the particle shape as shown in FIG. 1. FIG. 1 is a photograph substituted for a drawing, which shows the granulated powder coating composition as seen through a scanning electron microscope (magnification: 1000).

EXAMPLE 2

Figure 2:
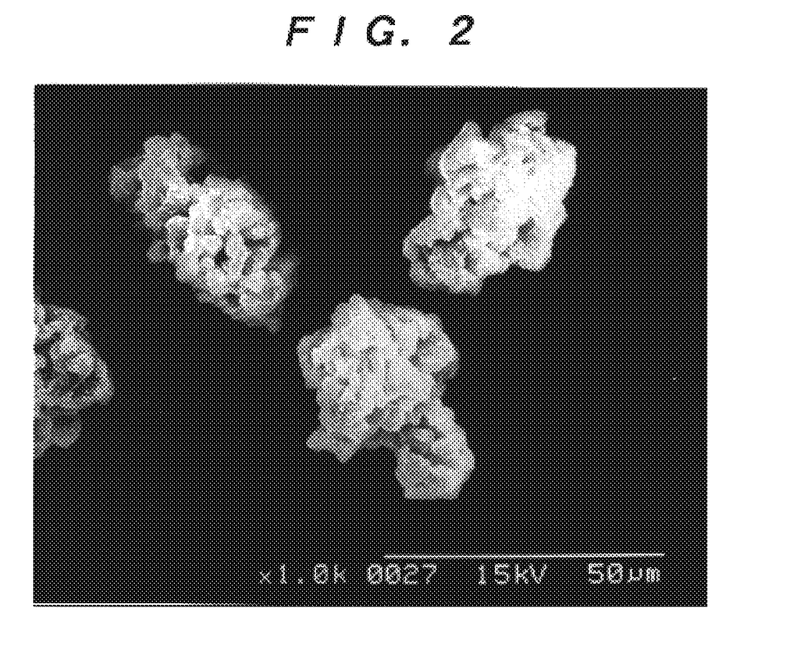
FIG. 2 is a photograph substituted for a drawing, showing the powder coating composition of the invention obtained in Example 2 as seen through a scanning electron microscope.

A granulated powder coating composition was prepared by repeating the procedure of Example 1 except that the granulation was carried out at 60° C. The obtained composition of the invention had an average particle size of about 21 μm and the particle shape as shown in FIG. 2. FIG. 2 is a photograph substituted for a drawing, which shows the granulated powder coating composition as seen through a scanning electron microscope (magnification: 1000).

EXAMPLE 3

200 parts of the same thermosetting acrylic resin powder coating composition as used in Example 1 was placed in a 2-liter, high-speed mixer (a product of Fukae Kogyo K.K.). While agitating the content of the mixer at an agitator speed of 500 rpm and a chopper speed of 4000 rpm, 60 parts of a 5% aqueous solution of polyethylene glycol 4000 was placed into the mixer, and the resulting mixture was heated at 25° C. for 30 minutes, for granulation. The obtained granules were heated to 40° C., dried under reduced pressure at 40° C. for 20 minutes, and cooled to 20° C. over 15 minutes to obtain a granulated powder coating composition. The obtained composition of the invention had an average particle size of about 17 μm.

EXAMPLE 4

A granulated powder coating composition was prepared by repeating the procedure of Example 3 except that 10 parts of an acrylic resin emulsion (tradename "YODOSOL AD81", a product of NIPPON NSC Ltd., solids content: 45%, melting point of the acrylic copolymer resin: 200° C.) was used in place of polyethylene glycol 4000. The obtained composition of the invention had an average particle size of about 21 μm.

EXAMPLE 5

A granulated powder coating composition was prepared by repeating the procedure of Example 4 except that the granulation was carried out at 50° C. The obtained composition of the invention had an average particle size of about 24 μm.

EXAMPLE 6

Stearyl alcohol (tradename "Kalcol 8098", a higher alcohol manufactured by Kao Corp., melting point: 59° C.) was finely ground in a jet mill and sieved, giving a powder having an average particle size of about 6 μm.

A high-speed mixer was charged with 200 parts of the same thermosetting acrylic resin powder coating composition as used in Example 1 and 20 parts of the finely ground stearyl alcohol. The content of the mixer was heated at 50° C. for 30 minutes with agitating at an agitator speed of 500 rpm and a chopper speed of 4000 rpm, for granulation. The resulting granules were cooled to 20° C. over 15 minutes to obtain a granulated powder coating composition. The obtained composition of the invention had an average particle size of about 20 μm.

EXAMPLE 7

(1) Preparation of Glycidyl-Containing Vinyl Copolymer Resin A-1

1000 parts of toluene was placed in an ordinary reaction vessel for vinyl resin synthesis equipped with a stirrer, thermometer and reflux condenser, and stirred with heating. When the toluene started to be refluxed, a mixture of 7 parts of a polymerization initiator (azobisdimethylvaleronitrile) and a monomer mixture consisting of 35 parts of glycidyl methacrylate, 15 parts of styrene, 25 parts of methyl methacrylate and 25 parts of n-butyl acrylate was added dropwise over about 2 hours. After completion of addition, reflux was continued for further 3 hours, and then terminated to allow the toluene to flow out of the reaction vessel. When the temperature of the content of the reaction vessel reached 150° C., the remaining toluene was distilled off under reduced pressure. The mixture remaining in the reaction vessel was cooled to obtain a glycidyl-containing vinyl copolymer resin A-1. The resin A-1 had a number average molecular weight of about 3000 and a softening point of about 80° C.

(2) Preparation of Glycidyl-Containing Vinyl Copolymer Resin A-2

A glycidyl-containing vinyl copolymer resin A-2 was prepared by repeating the procedure of the preparation of the glycidyl-containing vinyl copolymer resin A-1 except that the polymerization initiator was used in an amount of 11 parts. The resin A-2 had a number average molecular weight of about 1000, and a softening point of about 40° C.

(3) Preparation of Solid Binder

Dry blended in a Henschel mixer were 1000 parts of the glycidyl-containing vinyl copolymer resin A-2 and 290 parts of dodecanedioic acid, and the dry blend was melted and kneaded for dispersion in a twin-screw extruder. The kneaded melt was cooled and coarsely ground. The coarse grains were finely ground in a jet mill, and sieved to obtain a thermosetting acrylic resin powder coating composition having an average particle size of about 6 μm and a melting point of 20° C. (as determined by differential scanning calorimetry). The obtained composition was used as a solid binder.

(4) Preparation of Granulated Powder Coating Composition

Dry blended in a Henschel mixer were 1000 parts of the glycidyl-containing vinyl copolymer resin A-1 and 290 parts of dodecanedioic acid. The dry blend was melted and kneaded for dispersion in a twin-screw extruder. The kneaded melt was cooled and coarsely ground. The coarse grains were finely ground in a jet mill, and sieved to thereby obtain a thermosetting acrylic resin powder coating composition having an average particle size of about 6 μm and a melting point of 58° C. (as determined by differential scanning calorimetry).

180 parts of the above thermosetting acrylic resin powder coating composition and 20 parts of the solid binder obtained in (3) were placed in a high-speed mixer and heated at 40° C. for 30 minutes with agitating at an agitator speed of 500 rpm and a chopper speed of 4000 rpm, for granulation. The resulting granules were cooled to 20° C. over 15 minutes to obtain a granulated powder coating composition. The obtained composition of the invention had an average particle size of about 20 μm.

EXAMPLE 8

(1) Preparation of Glycidyl-Containing Vinyl Copolymer Resin A-3

A glycidyl-containing vinyl copolymer resin A-3 was prepared by repeating the procedure of the preparation of the glycidyl-containing vinyl copolymer resin A-1 in Example 7 (1) except for using a monomer mixture consisting of 35 parts of glycidyl methacrylate, 15 parts of styrene, 5 parts of methyl methacrylate and 45 parts of n-butyl acrylate. The resin A-3 had a number average molecular weight of about 3000 and a softening point of about 40° C.

(2) Preparation of Solid Binder

The procedure of the preparation of the solid binder in Example 7 (3) was repeated except that the resin A-3 obtained in (1) was used in place of the resin A-2, giving a thermosetting acrylic resin powder coating composition having an average particle size of about 6 μm and a melting point of 28° C. (as determined by differential scanning calorimetry). The obtained composition was used as a solid binder.

(3) Preparation of Granulated Powder Coating Composition

Dry blended in a Henschel mixer were 1000 parts of the glycidyl-containing vinyl copolymer resin A-1 obtained in (1) and 290 parts of dodecanedioic acid. The dry blend was melted and kneaded in a twin-screw extruder for dispersion. The kneaded melt was cooled and coarsely ground. The coarse grains were finely ground in a jet mill, and sieved to obtain a thermosetting acrylic resin powder composition having an average particle size of about 6 μm and a melting point of 58° C. (as determined by differential scanning calorimetry).

180 parts of the above thermosetting acrylic resin powder coating composition and 20 parts of the solid binder obtained in (2) were placed in a high-speed mixer, and heated at 40° C. for 30 minutes with agitating at an agitator speed of 500 rpm and a chopper speed of 4000 rpm, for granulation. The resulting granules were cooled to 20° C. over 15 minutes to thereby obtain a granulated powder coating composition. The obtained composition of the invention had an average particle size of about 22 μm.

EXAMPLE 9

The glycidyl-containing vinyl copolymer resin A-2 obtained in Example 7 (2) was finely ground in a jet mill, and sieved to obtain a resin powder having an average particle size of about 5 µm. The resin powder was used as a solid binder.

A high-speed mixer was charged with 200 parts of the same thermosetting acrylic resin powder coating composition as used in Example 1 and 200 parts of the finely ground vinyl copolymer resin A-2 obtained above. The content of the mixer was heated at 40° C. for 30 minutes with agitating at an agitator speed of 500 rpm and a chopper speed of 4000 rpm, for granulation. The resulting granules were cooled to 20° C. over 15 minutes to obtain a granulated powder coating composition. The obtained composition of the invention had an average particle size of about 19 µm.

EXAMPLE 10

Dry blended in a Henschel mixer were 980 parts of the glycidyl-containing vinyl copolymer resin A-1 obtained in Example 7 (1), 20 parts of the glycidyl-containing vinyl copolymer resin A-2 (solid binder) obtained in Example 7 (2) and 290 parts of dodecanedioic acid. The dry blend was melted and kneaded for dispersion in a twin-screw extruder. The kneaded melt was cooled and coarsely ground. The coarse grains were finely ground in a jet mill, and sieved to obtain a thermosetting acrylic resin powder coating composition having an average particle size of about 6 µm and a melting point of 52° C. (as measured by differential scanning calorimetry).

200 parts of the above-obtained powder coating composition was placed in a high-speed mixer, and heated at 40° C. for 30 minutes with agitating at an agitator speed of 500 rpm and a chopper speed of 4000 rpm, for granulation. The resulting granules were cooled to 20° C. over 15 minutes to obtain a granulated powder coating composition. The obtained composition of the invention had an average particle size of about 20 µm.

EXAMPLE 11

200 parts of the same thermosetting acrylic resin powder coating composition as used in Example 1 was placed in a high-speed mixer. While agitating the content of the mixer at an agitator speed of 500 rpm and a chopper speed of 4000 rpm, 40 parts of a 10% aqueous solution of acetone was added and the resulting mixture was heated at 25° C. for 30 minutes, for granulation. The resulting granules were dried under reduced pressure at 40° C. for 20 minutes, and then cooled to 20° C. over 15 minutes to obtain a granulated powder coating composition. The obtained composition of the invention had an average particle size of about 17 µm.

EXAMPLE 12

A granulated powder coating composition was prepared by repeating the procedure of Example 11 except that a 10% aqueous solution of isopropyl alcohol was used in place of the 10% aqueous solution of acetone. The obtained composition of the invention had an average particle size of about 15 µm.

EXAMPLE 13

200 parts of the same thermosetting acrylic resin powder coating composition as used in Example 1 was mixed in 800 parts of an aqueous solution of 0.2 parts of a surfactant (tradename "Spamine S", an anionic surfactant manufactured by Miyoshi Yushi K.K.) while stirring with a disperser, giving a slurry B-1 of the powder coating composition.

500 parts of the slurry B-1 was placed in a high-speed mixer, and heated at 50° C. for 30 minutes with agitating at an agitator speed of 500 rpm and a chopper speed of 4000 rpm, for granulation. The resulting granules were dried under reduced pressure at 40° C. for 30 minutes, and cooled to 20° C. over 15 minutes to obtain a granulated powder coating composition. The obtained composition of the invention had an average particle size of about 17 µm.

EXAMPLE 14

200 parts of the same thermosetting acrylic resin powder coating composition as used in Example 1 was mixed, while stirring with a disperser, in 800 parts of an aqueous solution of 0.2 parts of a surfactant (tradename "Spamine S", an anionic surfactant manufactured by Miyoshi Yushi K.K.) and 5 parts of polyethylene glycol 4000, giving a slurry B-2 of the powder coating composition.

A granulated powder coating composition was prepared in the same manner as in Example 13 except that the slurry B-2 was used in place of the slurry B-1. The obtained composition of the invention had an average particle size of about 18 µm.

EXAMPLE 15

(1) Preparation of Liquid Photocurable Composition C-1

580 parts of xylene and 250 parts of n-butanol were placed in a 5-liter glass flask equipped with a stirrer, thermometer and condenser, and heated to 125° C. in a heating mantle. At the same temperature, a mixture of 72 parts of a polymerization initiator (azobisisobutyronitrile) and a monomer mixture consisting of 432 parts of glycidyl methacrylate, 432 parts of styrene, 432 parts of n-butyl acrylate and 144 parts of methacrylic acid was added dropwise at a uniform rate over 4 hours. The resulting mixture was aged for 30 minutes, and a mixture of 90 parts of xylene, 40 parts of n-butanol and 14.4 parts of azobisisobutyronitrile was added dropwise over 2 hours, followed by 2-hour aging, to thereby obtain a solution of a glycidyl-containing vinyl resin with the final rate of polymerization of 100%. The obtained resin solution had a polymer solids content of 60% and a Gardner viscosity (25° C.) of U. The resin had a number average molecular weight of 7000.

5 parts of "Cyracure UVI-6990" (a sulfonium salt-based initiator for photo-induced cationic polymerization, manufactured by Union Carbide Corp., a U.S. company) was added to 167 parts (resin solids content: 100 parts) of the glycidyl-containing vinyl resin solution, giving a liquid photocurable composition C-1 having a solids content of 61%.

(2) Preparation of Granulated Powder Coating Composition 200 parts of the same thermosetting acrylic resin powder coating composition as used in Example 1 was placed in a high-speed mixer. While agitating the content of the mixer at an agitator speed of 500 rpm and a chopper speed of 4000 rpm, 10 parts (on a solid basis) of the photocurable composition C-1 was added, and the resulting mixture was irradiated with UV light (for 5 seconds using a mercury lamp) and then heated at 25° C. for 30 minutes, for granulation. The resulting granules were dried under reduced pressure at 40° C. for 20 minutes, and cooled to 20° C. over 15 minutes to obtain a granulated powder coating composition. The obtained composition of the invention had an average particle size of about 18 µm.

EXAMPLE 16

(1) Preparation of Liquid Photocurable Composition C-2

580 parts of xylene and 250 parts of n-butanol were placed in a 5-liter glass flask equipped with a stirrer, thermometer and condenser, and heated to 125° C. in a heating mantle. At the same temperature, a mixture of 72 parts of a polymerization initiator (azobisisobutyronitrile) and a monomer mixture consisting of 432 parts of 3,4-epoxycyclohexylmethyl methacrylate, 432 parts of styrene, 432 parts of n-butyl acrylate and 144 parts of methacrylic acid. The resulting mixture was aged for 30 minutes. and a mixture of 90 parts of xylene, 40 parts of n-butanol and 14.4 parts of azobisisobutyronitrile was added dropwise over 2 hours, followed by 2-hour aging, to thereby obtain a solution of a glycidyl-containing vinyl resin with the final rate of polymerization of 100%. The resin solution had a polymer solids content of 60% and a Gardner viscosity (25° C.) of T. The resin had a number average molecular weight of 7000.

5 parts of "Cyracure UVI-6990" (a sulfonium salt-based initiator for photo-induced cationic polymerization, manufactured by Union Carbide Corp., a U.S. company) was added to 167 parts (resin solids content: 100 parts) of the glycidyl-containing vinyl resin solution, giving a liquid photocurable composition C-2 having a solids content of 61%.

(2) Preparation of Granulated Powder Coating Composition

A granulated powder coating composition was prepared in the same manner as in Example 15 except that the liquid photocurable composition C-2 was used in place of the liquid photocurable composition C-1. The obtained composition of the invention had an average particle size of about 19 $\mu$m.

EXAMPLE 17

2000 parts of the same thermosetting acrylic resin powder coating composition as used in Example 1 was granulated by applying a pressure of 1000 Kg/cm$^2$ using "Roller Compactor RCP-200H" (tradename, a compression apparatus manufactured by Kurimoto, Ltd.), giving a solid product in the form of grains having a particle size of about several millimeters. The solid product was ground using a pin disc, and sieved for classification to thereby obtain a granulated powder coating composition. The obtained composition of the invention had an average particle size of about 22 $\mu$m.

EXAMPLE 18

A granulated powder coating composition was prepared in the same manner as in Example 17 except that the granulation was carried out by applying a pressure of 2000 Kg/cm$^2$. The obtained composition of the invention had an average particle size of about 25 $\mu$m.

EXAMPLE 19

Dry blended in a Henschel mixer was 2000 parts of the same thermosetting acrylic resin powder coating composition as used in Example 1, and 50 parts of stearyl alcohol (tradename "Kalcol 8098", a product of Kao Corp.) which had been ground to an average particle size of 6 $\mu$m. The dry blend was granulated by applying a pressure of 1000 Kg/cm$^2$, using "Roller Compactor RCP-200H" (a product of Kurimoto Ltd.), to form a solid product in the form of grains having a particle size of about several millimeters. The solid product was ground using a pin disc, and sieved for classification to thereby obtain a granulated powder coating composition. The obtained composition of the invention had an average particle size of about 22 $\mu$m

EXAMPLE 20

1200 parts of the same thermosetting acrylic resin powder coating composition as used in Example 1 was granulated by treating the starting composition in "Hybridizer NHS-O" (tradename, an impact apparatus for powders, manufactured by Nara Machinery Co., Ltd.) at a speed of 12000 rpm for 5 minutes, to thereby obtain a granulated powder coating composition. The obtained composition of the invention had an average particle size of about 14 $\mu$m.

EXAMPLE 21

Dry blended in a Henschel mixer were 100 parts of the same thermosetting acrylic resin powder coating composition as used in Example 1, and 5 parts of stearyl alcohol (tradename "Kalcol 8098", a product of Kao Corp.) which had been ground to an average particle size of 6 $\mu$m. The dry blend was granulated by treating in "Hybridizer NHS-O" (tradename, an impact apparatus for powders, manufactured by Nara Machinery Co., Ltd.) at a speed of 12000 rpm for 5 minutes, to thereby obtain a granulated powder coating composition. The obtained composition of the invention had an average particle size of about 18 $\mu$m.

COMPARATIVE EXAMPLE 1

Figure 3:
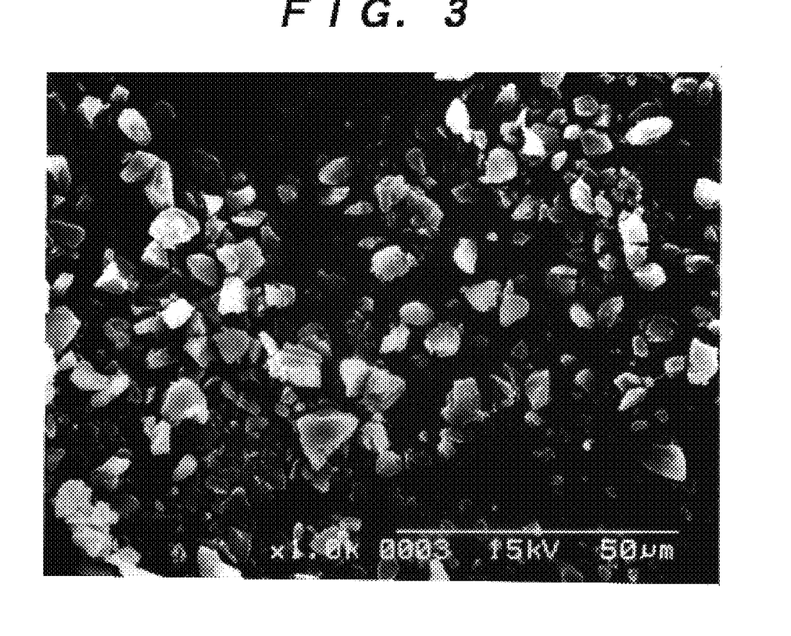
FIG. 3 is a photograph substituted for a drawing, showing the comparative powder coating composition obtained in Comparative Example 1 as seen through a scanning electron microscope.

The thermosetting acrylic resin powder coating composition as used in Example 1 was used as a comparative powder coating composition. The powder coating composition had an average particle size of about 6 $\mu$m, and the particle shape as shown in FIG. 3. FIG. 3 is a photograph substituted for a drawing, which shows the powder coating composition as seen through a scanning electron microscope (magnification: 1000).

COMPARATIVE EXAMPLE 2

Figure 4:
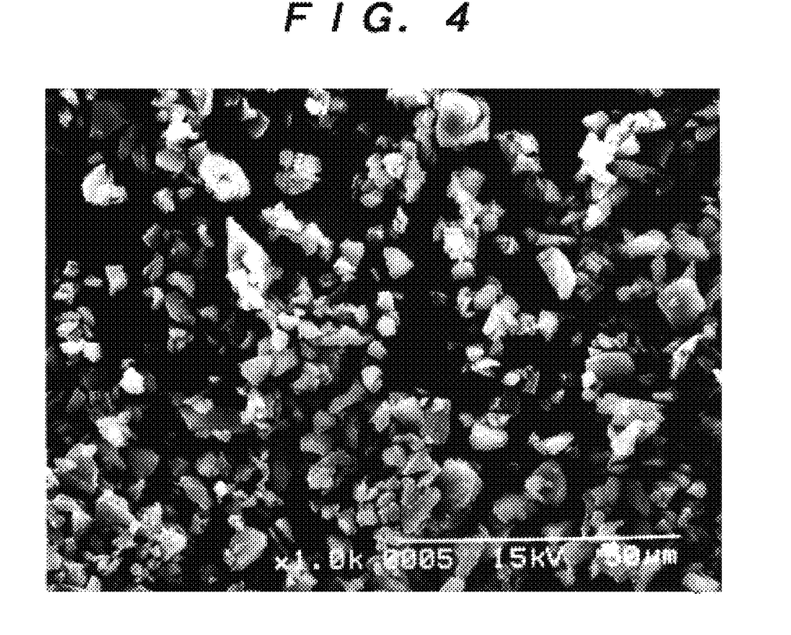
FIG. 4 is a photograph substituted for a drawing, showing the comparative powder coating composition obtained in Comparative Example 2 as seen through a scanning electron microscope.

A comparative granulated powder coating composition was prepared by repeating the procedure of Example 1 except that the granulation was carried out at 40° C. The obtained composition had an average particle size of about 7 $\mu$m and the particle shape as shown in FIG. 4. FIG. 4 is a photograph substituted for a drawing, and shows the granulated powder coating composition as seen through a scanning electron microscope (magnification: 1000)

COMPARATIVE EXAMPLE 3

A comparative granulated powder coating composition was prepared by repeating the procedure of Example 17 except that the granulation was carried out at a pressure of 90 Kg/cm$^2$. The obtained composition had an average particle size of about 8 $\mu$m.

The average particle size, application workability, coating efficiency and film smoothness of the powder coating compositions obtained in Examples 1 to 21 and Comparative Examples 1 to 3 were determined by the following methods. Average particle size (D50): "Microtrac" (tradename of a FRA particle size analyzer manufactured by Nikkiso K.K.) was used. The average particle size is defined as a particle size ($\mu$m) with a cumulative frequency is 50%, as calculated from a curve indicating the cumulative frequency of the particle size based on the total volume of the powder composition.

Application workability: The powder coating composition was applied on a tin plate (300 mm×300 mm) placed perpendicularly, using an electrostatic coating apparatus (tradename "PG-1", a product of Matsuo Sangyo K.K.), to a thickness of 50 $\mu$m (when cured). The conditions for electrostatic powder coating were as follows: applied voltage; −70 KV, delivery; 150 g/min, gun distance (distance between the gun tip and the substrate surface); 200 mm, application time; 10 seconds. The application workability was evaluated according to the following criteria:

A; Good application workability (the delivery was even, and there was no sticking of the coating composition to the gun tip), B; Poor application workability (the delivery was uneven, and there was sticking of coating composition to the gun tip), C; Markedly poor application workability (the delivery was considerably uneven, and there was noticeable sticking of the coating composition to the gun tip.

Coating efficiency: The electrostatic powder coating was carried out in the same manner as in the application workability test, and the coating efficiency was calculated according to the following equation:

Coating efficiency(%)=(coating weight/delivery weight)×100

Film smoothness: An epoxy-based cationic electrodeposition coating composition was electrophoretically applied to 0.8 mm-thick, zinc phosphated dull steel plate to a thickness of 20 μm (when dried), followed by baking. An automotive surfacer was applied on the baked coating to a thickness of 20 μm (when dried), and baked. The resulting coating was wet-sanded with #400 sandpaper and dehydrated. Then, "Magicron Basecoat HM-22" (tradename, a metallic coating composition manufactured by Kansai Paint Co., Ltd.) was applied to the dehydrated coating surface to a thickness of about 15 μm (when cured), and cured by baking at 140° C. for about 30 minutes in a dryer, giving a test substrate. The powder coating composition was applied to the substrate surface by electrostatic coating to a thickness about 50 μm (when cured), and cured by heating at 160° C. for 30 minutes in a dryer.

The long-term waviness of the obtained coated plate was determined using "Wave Scan Plus" (tradename, of an apparatus for measuring orange peel, manufactured by BYK). The lower the obtained value, the better the film smoothness.

The test results are shown in Table 1.

TABLE 1

|  | Example | | | | | | | | |
|---|---|---|---|---|---|---|---|---|---|
|  | 1 | 2 | 3 | 4 | 5 | 6 | 7 | 8 | 9 |
| Average particle size (μm) | 14 | 21 | 17 | 21 | 24 | 20 | 20 | 22 | 19 |
| Application workability | A | A | A | A | A | A | A | A | A |
| Coating efficiency (%) | 92 | 91 | 92 | 90 | 92 | 93 | 91 | 92 | 92 |
| Film smoothness | 0.8 | 1.1 | 0.9 | 1.2 | 1.4 | 1.0 | 1.1 | 1.2 | 1.0 |

|  | Example | | | | | | | | |
|---|---|---|---|---|---|---|---|---|---|
|  | 10 | 11 | 12 | 13 | 14 | 15 | 16 | 17 | 18 |
| Average particle size (μm) | 20 | 17 | 15 | 17 | 18 | 18 | 19 | 22 | 25 |
| Application workability | A | A | A | A | A | A | A | A | A |
| Coating efficiency (%) | 91 | 90 | 90 | 91 | 92 | 91 | 92 | 93 | 92 |
| Film smoothness | 1.2 | 0.9 | 0.9 | 1.0 | 1.1 | 1.2 | 1.1 | 1.2 | 1.1 |

|  | Example | | | Comp. Ex. | | |
|---|---|---|---|---|---|---|
|  | 19 | 20 | 21 | 1 | 2 | 3 |
| Average particle size (μm) | 22 | 14 | 18 | 6 | 7 | 8 |
| Application workability | A | A | A | C | C | C |
| Coating efficiency (%) | 92 | 90 | 91 | 35 | 38 | 42 |
| Film smoothness | 0.9 | 0.8 | 1.1 | 16.0 | 17.0 | 16.8 |

What is claimed is:

1. A process for preparing a granulated powder coating composition, the process comprising granulating a starting powder coating composition having an average particles size of 10 μm or less to an average particle size suitable for powder coating, the granulation being carried out by heating with agitation the starting powder coating composition in a powder state, at a temperature at which the starting powder coating composition melts at the particle surfaces but does not melt in the particle interiors.

2. A process for preparing a granulated powder coating composition, the process comprising granulating a starting powder coating composition having an average particle size of 10 μm or less to an average particle size suitable for powder coating, the granulation being carried out by dry blending the starting powder coating composition with a solid binder (b) having an average particle size of 10 μm or less, and heating the dry blend at a temperature at which the binder (b) melts but the starting powder coating composition does not melt.

3. A process according to claim 2 wherein the solid binder (b) has a melting point lower than that of the starting powder coating composition and is at least one member selected from the group consisting of resins, curing agents for the starting powder coating composition, higher alcohols, monobasic acids and waxes.

4. A process for preparing a granulated powder coating composition, the process comprising granulating a starting powder coating composition having an average particle size of 10 µm or less to an average particle size suitable for powder coating, the granulation being carried out by adding a liquid photocurable composition (e) dropwise to the starting powder coating composition with agitation, curing the photocurable composition by light irradiation, and drying the obtained granules under reduced pressure.

5. A process according to claim 4 wherein the liquid photocurable composition (e) comprises an epoxy-containing resin, a photo-induced cationic polymerization catalyst and a medium.

* * * * *